Figure 1:
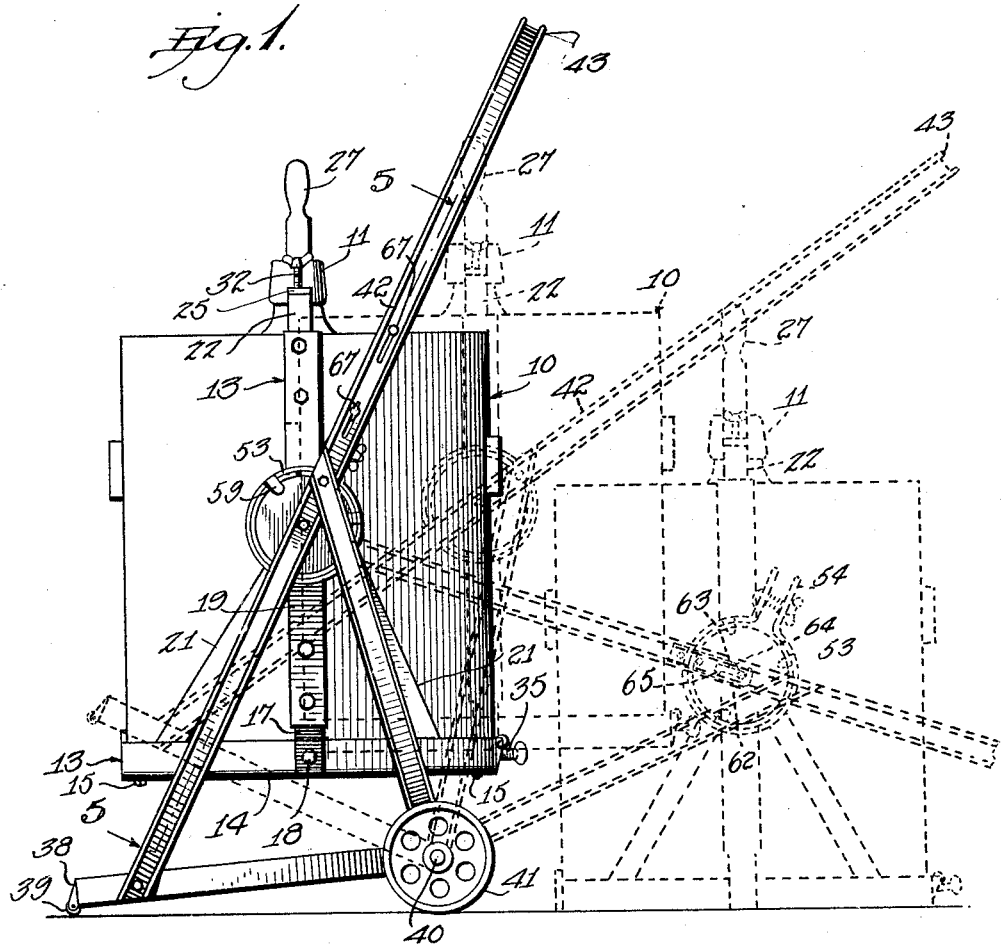

Nov. 17, 1931.   B. A. BERGER   1,832,523
CARBOY TRUCK
Filed April 25, 1928    3 Sheets-Sheet 1

Inventor
B.A. BERGER
By
C. L. Parker Jr.
Attorney

Nov. 17, 1931. B. A. BERGER 1,832,523
CARBOY TRUCK
Filed April 25, 1928 3 Sheets-Sheet 2

Inventor
B.A.BERGER

C. L. Parker Jr.
Attorney

Nov. 17, 1931. B. A. BERGER 1,832,523
CARBOY TRUCK
Filed April 25, 1928 3 Sheets-Sheet 3
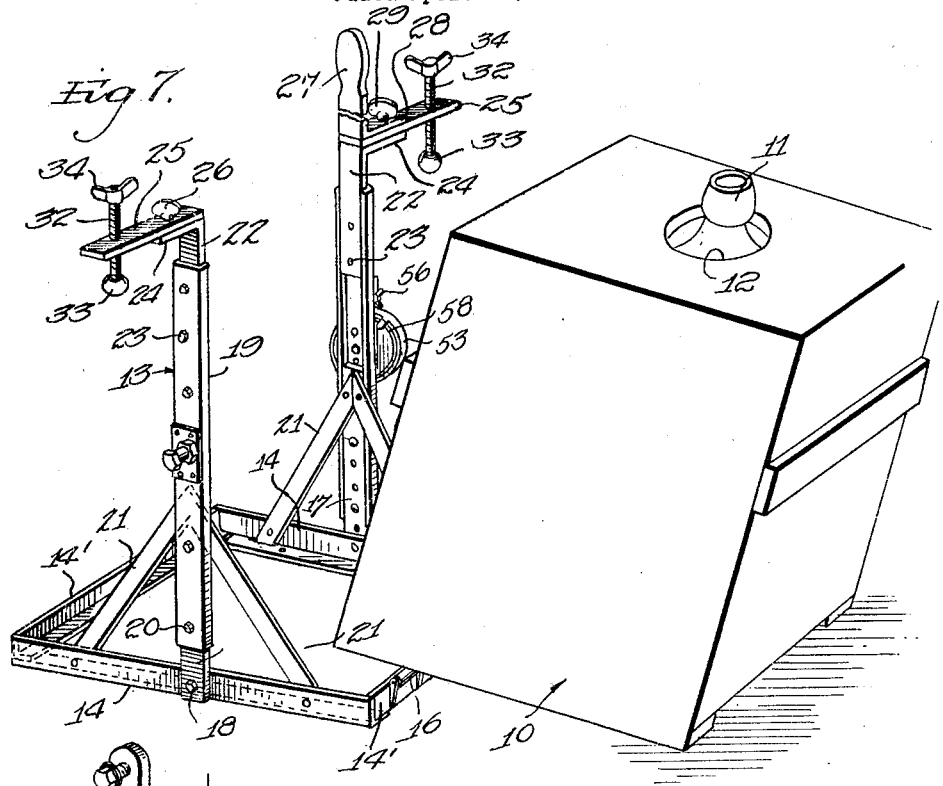
Inventor
B. A. BERGER
By C. L. Parker
Attorney Patented Nov. 17, 1931

1,832,523

UNITED STATES PATENT OFFICE

BRUNO A. BERGER, OF RICHMOND, VIRGINIA

CARBOY TRUCK

Application filed April 25, 1928. Serial No. 272,831.

This invention relates to carboy trucks, and more particularly to such a device adapted for the manual transportation of carboys filled with dangerous liquids such as acids and the like.

An object of the invention is to provide a novel device of the above mentioned character which is adapted to readily lift the carboy from the floor to the truck to be transported thereby.

A further object is to provide a novel frame in which the carboy is adapted readily to be placed, and to provide novel truck means associated with the frame for lifting the latter into operative position on the truck with the least exertion of manual force.

A further object is to provide novel means for mounting the carboy in the truck to permit it to tilt whereby the contents of the carboy may be poured therefrom, and to provide novel means for retarding the tilting movement of the carboy to and from normal position to prevent the splashing of the acid or other material in the carboy.

A further object is to provide a truck which is adapted to be operated manually for conveying a carboy or the like, and wherein the weight of the article transported is suspended in such a manner as to minimize the expenditure of labor necessary in moving the truck.

A further object is to provide novel means for securing the carboy in position in the frame and for facilitating the tilting of the carboy to pour the contents therefrom.

A further object is to provide a device of the above mentioned character having hook means adapted to be associated with coacting means whereby the truck is adapted to be tilted to pick up the carboy and frame and to be returned to a normal upright position, the hook means being adapted to pivotally support the frame without the use of fastening means and without any danger of the carboy becoming dislodged with respect to said hook means when the carboy is tilted to pour liquid therefrom.

A further object is to provide a frame in which the carboy is adapted to be mounted, having novel means associated therewith for facilitating the placing of the carboy in the frame.

A further object is to provide a transporting truck and an article carrier adapted to be pivotally supported thereby, and to provide novel brake means coacting with the truck and the article carrier to retard the swinging movement of the latter.

Other objects and advantages of the invention will become apparent during the course of the following description.

Figure 2:
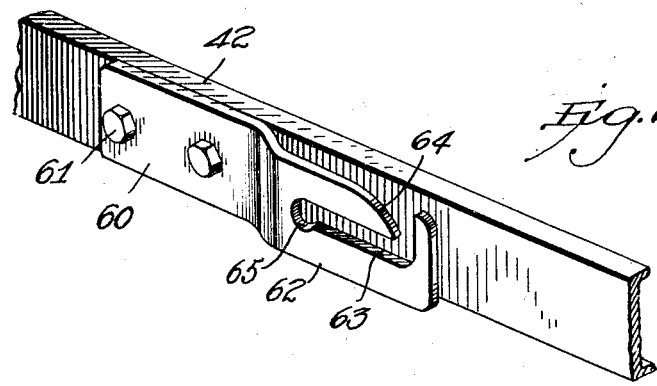
Figure 3:
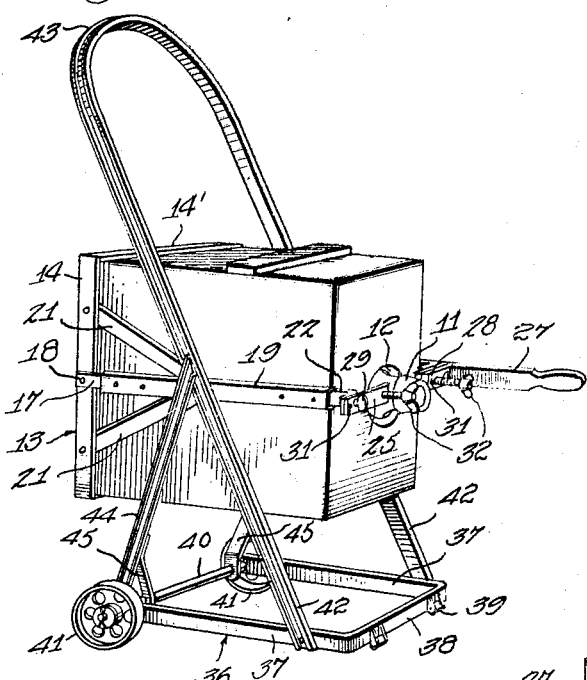
Figure 4:
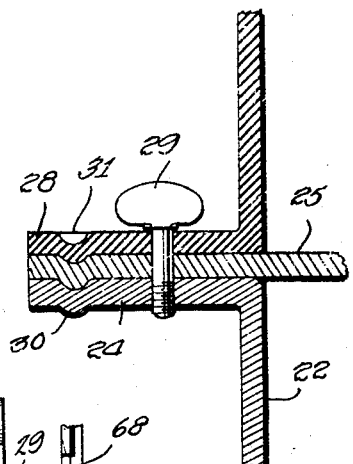
Figure 5:
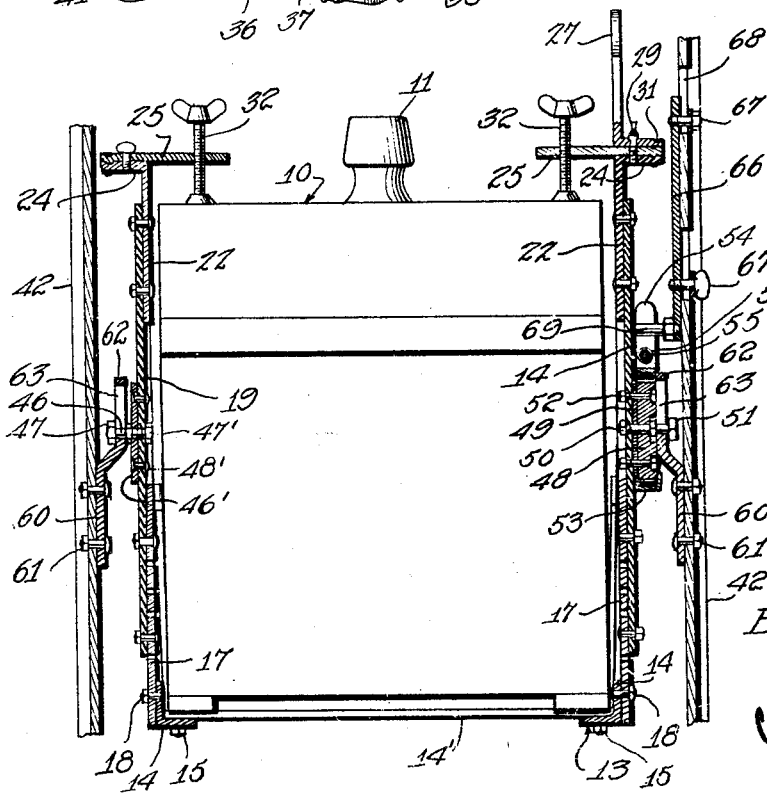

In the drawings I have shown one embodiment of the invention. In this showing,

Figure 1 is a side elevation,

Figure 2 is a fragmentary perspective view of a portion of one of the frame members of the truck and associated elements, Figure 3 is a perspective view showing the carboy in tilted position, Figure 4 is a fragmentary sectional view of a portion of the carboy clamping means, Figure 5 is a section taken substantially on line 5—5 of Figure 1, the carboy supporting frame being shown tilted in the line of section, Figure 6 is an enlarged fragmentary sectional view taken on the plane of Figure 5 showing the braking means and associated elements, Figure 7 is a detail perspective view of the carboy frame and the carboy, and, Figure 8 is a detail fragmentary perspective view of the braking means and associated elements.

Referring to the drawings the numeral 10 designates a preferably rectangular carboy in which a container 11 is arranged, the neck of the container projecting through an opening 12. As previously stated, the present invention is particularly adapted for use in transporting carboys filled with acids or other dangerous liquids.

The carboy is adapted to be arranged in a frame indicated as a whole by the numeral 13. This frame includes a substantially rectangular bottom portion preferably formed of side and end angle irons 14 and 14' and provided with bottom flanges 15. The bottom flanges of the end angle irons rest upon those of the side angle irons and are secured thereto by bolts 15 adapted to be selectively arranged in a series of openings in the side angles. Thus the frame is adjustable to carboys of different sizes, which rest upon the bottom flanges of the end angle irons. One side of the bottom 14 is provided with a plurality of rollers 16 by means of which the movement of the carboy into the frame is facilitated, as will be apparent. Obviously, these rollers may be arranged on opposite sides of the bottom 14, if desired.

Opposite sides of the bottom 14 are provided with vertically extending arms 17 bolted or otherwise secured thereto as at 18. Vertical side frame members 19, preferably formed of channel iron, are bolted or otherwise secured at their lower ends as at 20, to the upper ends of the upright arms 17. The latter elements are arranged within the channels formed in the frame members 19, whereby a rigid connection between these elements will be obtained. Diagonal braces 21 are connected between the bottom and the frame members 19, as shown in Figures 3 and 7. A plurality of bolt openings may be provided in the members 17 for the bolts 20 whereby the frame members 19 may be vertically adjusted for a purpose to be described.

Extensions 22 are arranged with their lower ends within the channels of the members 19 and extend vertically thereabove. These extensions may be bolted or otherwise secured to the members 19 as at 23, and are provided at their upper ends with horizontal outwardly extending ends 24. Clamping plates 25 are arranged upon the horizontal extensions 24, as shown in Figures 4 and 7. At one side of the frame a thumb bolt 26 passes through the clamping plate 25 and is threaded into the adjacent extension 24 to clamp these elements together as will become apparent. Above the other clamping plate 25, an operating handle 27 is arranged, having a lower horizontal projection 28 arranged in contact with the plate 25. A thumb bolt 29 passes through the projection 28 and clamping plate 25, and is threaded to the adjacent horizontal extension 24. Each of the extensions 24 and its associated clamping plate 25 is provided with preferably punched portions 30 which coact to prevent turning movement of the plates 25 under conditions to be described. These punched portions are clearly shown in Figure 4, and it will be apparent that the horizontal projection 28 of the handle 27 also is provided with a similar coacting punched portion 31.

One end of each plate 25 is provided with a clamping bolt 32 threaded therethrough and provided at its lower end with an engaging foot 33 adapted to contact with the top of the carboy to clamp the latter in position, as shown in Figure 5. The upper end of each bolt 32 is provided with a wing nut 34 for convenience in operation. If desired, one or more sides of the bottom 14 of the carboy frame also may be provided with a threaded clamping bolt 35 adapted to engage against the lower portion of one or more sides of the carboy.

The carboy and its frame are adapted to be transported by a truck indicated as a whole by the numeral 36. This truck comprises a substantially U-shaped bottom frame member including legs 37 and a base portion 38, the latter preferably being provided with small rollers 39 adapted to engage the floor or other surface upon which the truck is operated. An axle 40 is arranged across the free ends of the arms 37 and supports wheels 41. At a point adjacent the base 38 of the U-shaped frame, a pair of angularly arranged arms 42 are secured, these arms being integral and forming a part of a U-shaped frame member having a curved upper end 43 serving as the operating handle for the truck, as will become apparent.

The frame of which the arms 42 form a part is preferably formed of channel iron, and angular braces 44 of similar material are connected at one end to a point intermediate the ends of the arms 42 and at the opposite end to the arms 37 of the bottom frame. The arms 37 and braces 44, and the portions of the arms 42 beneath the braces 44 define triangular supports at the apex portions of which the weight of the carboy is supported. Thus when the device is in the normal position indicated in Figure 3, great rigidity is provided for supporting the carboy. If desired, small angle braces 45 may be connected between the axle 40 and the braces 44 to prevent flexing of the triangular supporting members previously referred to.

One of the frame members 19 is provided intermediate its length with a bolt 46 which projects a substantial distance outwardly of the frame member and has a head 47 on its outer end. A spacing plate 46' is secured against the adjacent member 19, and the bolt 46 passes through this plate. A nut 47' is threaded on the inner end of the bolt 46' and is arranged within the channel of the member 19. Outer rivets or bolts 48' may be used for securely anchoring the plate 46' to the member 19. The other frame member 19 is provided with a brake drum 48 preferably formed of cast iron and spaced from the frame member 19 by a plate 49. The plate and brake drum are connected to the adjacent frame member 19 by a bolt 50 which projects a substantial distance beyond the brake drum and is provided at its outer end with a head 51. Bolts 52 pass through the outer portions of the brake drum and through the plate 49 and frame member 19, the outer heads of these bolts and the head of the bolt 50 inwardly of the head 51 being countersunk in the brake drum as clearly shown in Figure 6.

A brake band 53 surrounds the brake drum, as shown in Figure 8, the band being split and provided with a pair of parallel spaced ends 54. An adjusting bolt 55 passes through the ends 54 at a point spaced from the extremities thereof, and a wing nut 56 is adapted to be threaded upon the bolt to draw the ends 54 together. A spring 57 surrounds the bolt 55 between the ends 54 and normally urges the latter upwardly, as will be apparent. A brake lining 58 is riveted or otherwise secured within the band 53 and is adapted to engage the outer periphery of the brake drum. A plurality of clips 59, preferably formed integral with the band 53, are bent inwardly adjacent the faces of the brake drum to prevent lateral displacement of the band 53 and its lining.

A bracket 60 is bolted as at 61 to each of the arms 42, as shown in Figures 2 and 5. The free end 62 of each bracket 60 is offset from the arm 62 and arranged substantially parallel thereto. This offset end is provided with a bayonet slot 63, one of the prongs of the bracket which defines the slot being curved as at 64 for a purpose to be described. The inner end of each slot 63 is provided with an enlarged circular portion 65 the bottom of which is offset with respect to the bottom of the slot 63 for a purpose to be described. The slots 63 are adapted to receive the projecting ends of the bolts 47 and 50 respectively, as shown in Figure 5. When the weight of the carboy is supported in operative position by the bolts 47 and 50, the projecting ends of the latter will be arranged in the offset portions of the circular openings 65, thus preventing any possibility of the bolts sliding toward the open ends of the slots. Accordingly the bolts referred to remain in operative position without the use of any fastening elements.

A plate 66 is secured against the arm 42 arranged adjacent the brake drum, as shown in Figure 5. Screws 67, one of which is preferably provided with a wing nut, are threaded in the plate 66 and operate in slots 68 formed in the adjacent arm 42. Thus it will be apparent that the plate 66 is adapted to partake of sliding movement longitudinally with respect to the arm 42 when the screws 67 are loosened. A pin 69 is carried by the lower end of the plate 66 and is adapted to be arranged between the arms 54 of the brake band.

The operation of the device is as follows:

The frame 13 is arranged adjacent the carboy 10, and one side of the latter is lifted to permit one side of the bottom 14 to slide beneath the carboy. The operator may then permit the carboy to rest upon the rollers 16, whereupon the carboy readily may be moved into position in the frame 13. It will be apparent that the rollers 16 assist in moving the carboy to operative position. The carboy is adapted to rest upon the bottom flange 15, and if the set screw 35 (see Figure 1) is employed, it is screwed inwardly into engagement with the carboy. It will be apparent that the arms 25 will be in the position shown in Figure 7 when the carboy is moved into operative position, the nuts 26 and 29 having been loosened to permit the arms 25 to swing outwardly. It will be apparent that the loosening of the wing nuts referred to permits the punched portions 30 and 31 to become disengaged. After the carboy is in position, the arms 25 are swung inwardly to operative position, whereupon the nuts 26 and 29 are tightened. With the punched portions 30 and 31 in engagement with each other and the wing nuts tightened, it will be apparent that the arms 25 will be secured against swinging movement. The bolts 32 are then tightened to bring the feet 33 into firm engagement with the top of the carboy, whereupon the latter will be securely anchored in position and the frame and carboy will be ready to be picked up by the truck.

The truck is then moved to a position adjacent the carboy as shown in solid lines in Figure 1, whereupon the handle 43 is moved downwardly to the lower dotted line position. The handle 43 then may be maneuvered to bring the projecting portions of the bolts 46 and 50 into the open end of the slot 63, the curvature 64 of the brackets assisting in this action. Since the pivot bolts are arranged wholly within the slots 63, the operator may move the handle 43 upwardly to a point adjacent that indicated by the intermediate dotted line position in Figure 1. The length of the bars 42 is such that considerable leverage is afforded to permit the operator to readily elevate the carboy. When the arms 42 pass a horizontal position, as the handle 43 is elevated, the pivot bolts will slide downwardly into the inner ends of the slots 63 whereupon they come to rest in the enlarged circular portions 65. From this position, the pivot bolts are not easily dislodged, and accordingly no extraneous fastening means need be employed. When the handle reaches a position approximating that shown in dotted lines in Figure 1, the pivot bolts will be substantially directly above the axle 40. It is in this position that the operator places the parts in order to move the truck across the floor, the side of the bottom frame 36 opposite the wheels 41 being somewhat elevated. With the parts in this position, practically no load will be placed on the operator's hands, and the only force which must be exerted is that necessary to move the weight of the parts along the floor. When the truck is at rest, it will be arranged in the solid line position shown in Figure 1, the pivot bolts being arranged intermediate the ends of the points of support of the truck, thus effectually preventing the device from upsetting. The small rollers 39 are provided to permit the truck to be moved readily over short distances without having to tilt the truck to the operative rolling position.

The brake means described is adapted to operate to prevent sudden swinging of the carboy frame, and to prevent the frame from swinging too freely. When the truck is placed in the lower dotted line position in Figure 1 to pick up the carboy and frame, the nut 56 is loosened to free the brake lining from the drum, whereupon the band 53 may be freely moved. The arms 54 are turned downwardly to a position substantially parallel to the adjacent arm 42, whereupon the screw 67 which is provided with the wing nut is loosened to permit the plate 66 to be moved inwardly. This action brings the pin 69 to operative position between the arms 54, whereupon the wing nut 67 is tightened to secure the plate 66 against movement. Only one wing nut 67 need be employed, the other nut preferably being mounted stationary with only sufficient clearance to permit the sliding movement to take place.

With the parts in the position described, the wing nut 56 is turned to clamp the brake lining against the drum, and when the handle 43 is lifted, the brake band will be retained in its initial position with respect to the adjacent arm 42. Thus, the brake drum, which is secured to the carboy frame, will turn within the brake band, and the carboy will be prevented from swinging freely about its pivots. Accordingly, the free swinging and the consequent splashing of the acid or other liquid is effectively prevented.

When it is desired to pour some of the contents from the carboy, the operator may grasp the handle 27 and swing it downwardly as indicated in Figure 3. After pouring the desired quantity of liquid from the carboy, the handle 27 is moved back to normal position. It will be apparent that the carboy normally tends to swing to vertical position by gravity, and if the operator should merely release the handle 27, the braking action referred to will prevent the carboy from swinging any great distance beyond normal position, the swinging action being determined by the element of friction between the brake drum and band which may be varied by adjusting the wing nut 56.

From the foregoing it will be apparent that the present device readily may be employed for transporting articles from place to place, and is particularly adapted for use in connection with carboys filled with acids or other dangerous liquids. The carboy readily may be tilted until it is empty, whereupon it may be removed from the truck by reversing the operations previously referred to. By moving the truck to the lower dotted line position in Figure 1, the pivot bolts of the carboy frame readily may be released from the slots 62. It is desirable that several carboys at a time be placed in their retaining frame, and thus when one carboy is released from the truck, another one readily may be picked up. When it is not desired or necessary to utilize the braking means, it may be rendered inoperative merely by loosening the wing nut 67, sliding the plate 66 upwardly, and tightening the wing nut 67 to retain the pin 69 in inoperative position.

A number of detail features are included in the construction to facilitate the operation thereof under various conditions. For example, the bolts which secure together the angle irons 14 and 14' may be arranged in selected openings in the base of the angles 14 to vary the space between the angles 14' according to the width of the carboy being handled in the device. The bolts 20 may be arranged in selected openings in the members 17 to vary the position of the pivot bolts 46 and 50 vertically with respect to carboys of varying heights, whereby the pivot bolts may be always arranged above the center of gravity of a carboy to cause the latter to tend to move toward normal position.

The invention is not limited to its application to portable wheeled trucks. It will be apparent that the lower frame readily may be employed without the wheels, as a stand for supporting a carboy whereby it may be tilted.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:—

1. A device of the character described comprising a support, an article holder pivotally mounted in said support to swing about a horizontal axis, means for retarding the swinging movement of said article holder, and a member movable to render said means inoperative.

2. A device of the character described comprising a support, an article holder pivotally mounted in said support to swing about a horizontal axis, a brake element secured to said article holder, a second brake element frictionally engaging said first named element and freely movable with respect to said support, and means carried by said support for engaging said second named brake element to render it stationary with respect to said support.

3. A device constructed in accordance with claim 2 wherein said second named brake element comprises a split band having spaced parallel ends, said means comprising a member slidable with respect to said support to arrange a portion thereof between said spaced ends.

4. A device of the character described comprising a frame, a pair of supporting wheels arranged at opposite sides of said frame adjacent one end thereof, said frame including a pair of upstanding side members at each side thereof inclined from the vertical toward each other and secured together, one of the side members at each side of said frame being extended upwardly a substantial distance beyond the other member and secured together to form a handle, and an article holder pivotally connected above its center of gravity to opposite sides of said frame, the pivot axis of said article holder being arranged normally in a vertical plane passing through said frame inwardly of said wheels.

5. A device constructed in accordance with claim 4 provided with a brake drum secured to said article holder, a brake band frictionally engaging said drum, and releasable means for connecting said brake band to said frame.

6. A device constructed in accordance with claim 4 wherein said article holder comprises a base and a pair of normally upstanding side members having their upper ends turned outwardly, a clamping plate arranged on each of said outwardly turned ends, a screw connecting each plate to its associated outturned end, means carried by said plates and said outturned ends for preventing turning movement of the former with respect to the latter when said screws are tightened, and clamping screws carried by said plates and adapted to engage an article arranged in said holder.

7. A device of the character described comprising a support, an article holder pivotally mounted in said support, brake means for retarding the swinging movement of said article holder, and including relatively movable members carried respectively by said support and said article holder and frictionally engaging each other, means for adjusting the frictional engagement of such relatively movable members, and means independent of said adjusting means for rendering the brake means inoperative.

In testimony whereof I affix my signature.

BRUNO A. BERGER.